United States Patent [19]
Cuffiana et al.

[11] Patent Number: 5,278,118
[45] Date of Patent: * Jan. 11, 1994

[54] CATALYSTS FOR THE PREPARATION OF ELASTOMERIC OLEFINIC COPOLYMERS

[75] Inventors: Illaro Cuffiana; Roberto Fabbri, both of Ferrara; Gian F. Margelli, Rome; Umberto Zucchini, Ferrara, all of Italy

[73] Assignee: Ausimont, S.p.A., Milan, Italy

[*] Notice: The portion of the term of this patent subsequent to Dec. 12, 2006 has been disclaimed.

[21] Appl. No.: 865,373

[22] Filed: Apr. 8, 1992

Related U.S. Application Data

[63] Continuation of Ser. No. 569,521, Aug. 20, 1990, abandoned, which is a continuation of Ser. No. 389,632, Aug. 4, 1989, abandoned, which is a continuation of Ser. No. 103,176, Sep. 30, 1987, Pat. No. 4,886,770.

[30] Foreign Application Priority Data

Oct. 2, 1986 [IT] Italy .............................. 21872 A/86

[51] Int. Cl.$^5$ .................................................. C08F 4/68
[52] U.S. Cl. ....................... 502/116; 502/115; 502/121; 502/125; 502/126; 502/127; 526/125
[58] Field of Search ............... 502/115, 116, 121, 125, 502/126, 127

[56] References Cited

U.S. PATENT DOCUMENTS

| | | | |
|---|---|---|---|
| 3,789,036 | 1/1974 | Longi et al. | 260/80.7 |
| 3,803,105 | 4/1974 | Galli et al. | 260/80.78 |
| 3,830,787 | 8/1974 | Susa et al. | 260/94.9 D |
| 3,839,313 | 10/1974 | Galli et al. | 260/94.9 DA |
| 3,850,842 | 11/1974 | Longi et al. | 502/105 |
| 3,953,414 | 4/1976 | Galli et al. | 526/348 |
| 4,013,823 | 3/1977 | Longi et al. | 502/126 X |
| 4,089,808 | 5/1978 | Zucchini et al. | 502/105 |
| 4,107,416 | 8/1978 | Giannini et al. | 526/114 |
| 4,111,835 | 9/1978 | Foschini et al. | 502/9 |
| 4,113,654 | 9/1978 | Mayr et al. | 502/115 |
| 4,124,532 | 11/1978 | Giannini et al. | 502/111 |
| 4,174,299 | 11/1979 | Giannini et al. | 502/125 X |
| 4,174,429 | 11/1979 | Giannini et al. | 526/114 |
| 4,218,339 | 8/1980 | Zucchini et al. | 502/111 |
| 4,220,554 | 9/1980 | Scata et al. | 502/125 X |
| 4,250,104 | 2/1981 | Giannini et al. | 260/448 AD |
| 4,265,785 | 5/1981 | Giannini et al. | 502/104 |
| 4,347,160 | 8/1982 | Epstein et al. | 502/121 X |
| 4,886,770 | 12/1989 | Cuffiani et al. | 502/115 X |

FOREIGN PATENT DOCUMENTS

| | | |
|---|---|---|
| 0096770 | 12/1983 | European Pat. Off. |
| 0114526 | 8/1984 | European Pat. Off. |
| 0171606 | 2/1986 | European Pat. Off. |
| 2626097 | 12/1976 | Fed. Rep. of Germany |
| 1513480 | 6/1978 | United Kingdom |

*Primary Examiner*—Patrick P. Garvin
*Attorney, Agent, or Firm*—Bryan Cave

[57] ABSTRACT

Catalysts for the preparation of copolymers of ethylene and/or alpha-olefins and optionally dienes, are obtained by reacting an Al-alkyl with a solid catalytic component comprising:

(A) a magnesium compound containing at least an Mg-halogen bond;
(B) a halogenated compound of at least partly trivalent Ti or V, containing at least a Ti—OR or V—OR bond, wherein the Mg/Ti(V), halogen/Ti(V), halogen/Mg and OR/Ti(V) atomic ratios are within determined ranges; and
(C) an electron-donor compound.

Elastomeric copolymers endowed with improved tension set values are obtained with said catalysts.

14 Claims, No Drawings

CATALYSTS FOR THE PREPARATION OF ELASTOMERIC OLEFINIC COPOLYMERS

This is a continuation of U.S. application Ser. No. 07/569,521, filed Aug. 20, 1990 and now abandoned, which is a continuation of U.S. application Ser. No. 07/389,632, filed Aug. 4, 1989 and now abandoned, which is a continuation of U.S. application Ser. No. 07/103,176, filed Sep. 30, 1987 (U.S. Pat. No. 4,886,770), which are incorporated by reference herein.

THE PRIOR ART

The copolymerization of ethylene and of alpha-olefins in the presence, or in the absence of diolephins has been carried out heretofore with various types of catalysts. One of the most used of such catalysts is obtained as the product of a reaction of a vanadium compound with an organometallic compound which comprises a metal from Group I, II or III of the Periodic System (U.K. 1,277,629; IT 890,604; U.K. 1,277,353; IT 879,026; U.K. 1,519,472).

The copolymers obtained with this catalyst are completely amorphous or substantially amorphous; the activity of these catalysts, and consequently, the yield of polymers based on the amount of catalyst used is relatively low.

Catalysts for preparing saturated or unsaturated ethylenepropylene elastomers, endowed with a high catalytic activity, have already been disclosed by the present Applicant in some patents, e.g.: FR 2,111,137; U.S. Pat. No. 4,013,823.

The therein disclosed catalysts make it possible, due to their high activity, to produce saturated or unsaturated olefinic elastomers according to simplified and considerably less expensive processes. Purification steps for the obtained polymers are not required from the catalytic residues.

SUMMARY OF THE INVENTION

Novel catalytic systems have now been found which, are endowed with high catalytic activities and, consequently, exhibit comparable technical and economical advantages to those described above and which are capable of producing olefinic elastomers having appreciably improved elastic properties, in particular as measured by the values of tension set of the corresponding cured products.

The catalysts of the present invention comprise the product from the reaction of an Al-alkyl compound (co-catalyst) with a solid catalytic component wherein, as its essential constituents, the following are present:

A) a magnesium compound containing at least an Mg-halogen bond;

B) a halogenated compound of Ti or V, wherein Ti and V are at least partially trivalent, containing a metal-oxygen bond, i.e. a Ti—OR or V—OR bond, wherein R=alkyl, aryl or cycloalkyl containing from 1 to 20 carbon atoms, in which catalytic component the Mg/Ti(V), halogen/Ti(V), halogen/Mg and OR/Ti(V) atomic ratios are within the following ranges:

$0.2 \leq Mg/Ti(V) \leq 50$, preferably $0.5 \leq Mg/Ti(V) \leq 5$;
halogen/Ti(V) > 2, preferably 4–10;
halogen/Mg > 2, preferably 4–8;
OR/Ti(V) $\leq 1.5$, preferably $\leq 1$;

C) an electron-donor compound, containing one or more oxygen, silicon and/or phosphorus atoms, the electron-donor compound being an ether or an organic or inorganic ester. The (C) component is added in such an amount as to supply an electron-donor/Mg molar ratio comprised within the range: $0.01 \leq$ Donor/Mg $\leq 10$, preferably $0.1 \leq$ Donor/Mg $\leq 1$.

DETAILED DESCRIPTION OF THE INVENTION

The catalytic components of the present invention can be prepared according to various methods. Preferably, the method operates under conditions such that the magnesium compound is at least partially dissolved in one of the reactants other used.

The preferred methods are:

The First Preparation Method

Reaction between:

(1) an anhydrous magnesium halide, or a compound having formula XMgOR wherein X=OR, a halogen, or an R radical, and wherein R is an alkyl cycloalkyl or aryl radical of from 1 to 20 C atoms.

The magnesium halide is preferably magnesium chloride. Examples of XMgOR compounds are Mg chloroalkoxides; Mg dialkoxides; and alkyl-alkoxy-magnesium compounds. In the case of magnesium compounds not containing an Mg-halogen bond, such a bond is formed by reaction with the hereinunder specified compound (3).

(2) a compound having the general formula $O_x(OR)$-$ME^N[O_x(OR)_4]$, or Me(acetyl-acetonate)$_3$, wherein:

Me = Ti/OR (V);
R = an alkyl, aryl or cycloalkyl radical containing from 1 to 20 C atoms;
x = an integer larger than, or equal to, zero;
y = an integer larger than, or equal to 2;
2x+y = the valence of Me;
n = an integer from 1 to six inclusive.

Examples of preferred compounds are:
Ti(OC$_2$H$_5$)$_4$
Ti(O-n-C$_4$H$_9$)$_4$,
Ti(O-i-C$_3$H$_7$)$_4$,
Ti(OC$_6$H$_5$)$_4$,
V(O-i-C$_3$H$_7$)$_4$,
VO(O-i-C$_3$H$_7$)$_3$,
Ti-triacetylacetonate.

(3) a halogenated, preferably chlorinated, compound, capable of substituting in component (2) at least an -OR group with a halogen atom, such as, e.g., Al-alkyl halides such as Al-Et$_2$Cl, Al-EtCl$_2$, Al-alkyl sesquihalide, organic acid halides of the formula RCOX (X=halogen, preferably chlorine; R=an aliphatic or aromatic organic radical), hydrogen halides (such as HCl), SOCl$_2$, COCl$_2$, TiCl$_4$, BCl$_3$, and still others. Particularly interesting results are achieved when Al-alkyl halides, such as AlEtCl$_2$, Al-alkyl sesquihalides, and halogen-containing, or halogen and hydrogen-containing silicon compounds are used; these latter compounds, besides acting as halogenating agents, also perform the function of reducers. As examples of such silicon compounds, there can be mentioned: the silicon halides, having the formula SiX$_{4-n}$Y$_n$, wherein X, and Y represent halogen atoms (e.g., Cl and Br), and n is a number ranging from zero to 3 (with the limits being included), such as SiCl₄; the chlorosiloxanes, having the formula Si$_n$O$_{n-1}$Cl$_{2n+2}$, wherein n is a number ranging from 2 to 7 (with the limits being included), such as, e.g., Si₂OCl₆; the halogenated polysiloxanes, having the formula Si$_N$X$_{2n+2}$, wherein X=halogen and n is a number ranging from 2 to 6 (with the limits being included), e.g., Si₄Cl₁₀; the halosilanes, having the formula SiH$_{4-n}$X$_n$, wherein X=halogen and n is a number ranging from 1 to 3 (with the limits being included), e.g., SiHCl₃; the alkyl-halosilanes, having the formula R$_n$SiH$_x$Y$_y$, wherein R=an aliphatic or aromatic radical, X=halogen, n is a number ranging from 1 to 3 (with the limits being included), x is a number ranging from zero to 2 (with the limits being included), and y is a number ranging from 1 to 3 (with the limits being included), e.g., C₂H₅SiCl₃, CH₃SiCl₂H, (CH₃)₂SiCl₂; the alkoxy-halosilanes, having the formula Si(OR)$_{4-n}$X$_n$, wherein X=halogen, R=alkyl or aryl of from 1 to 20 C atoms, and n is a number ranging from 1 to 3 (with the limits being included), e.g., Si(OC₂H₅)Cl₃.

(4) an electron-donor compound as defined under above point (C), constituted by, or comprising an ether or an organic or inorganic ester. Examples of such compounds are:

dialkyl-ethers or aryl-alkyl-ethers, in particular di-n-butyl-ether, diisopropyl-ether, diisoamyl-ether, anisole, dimethylglycol-ether CH₃—O—CH₂—CH₂—O—CH₃, diethyl-polyoxyethylene-glycol-ether C₂H₅—O—[—CH₂—CH₂—O—]$_n$—C₂H₅;

organic aliphatic, cycloaliphatic and aromatic esters, in particular ethyl acetate, vinyl acetate, cyclohexyl acetate, methyl p-toluate, ethyl p-anisate, benzyl benzoate;

inorganic esters, in particular ethyl orthosilicate, diphenyl-dimethoxy-silane, dimethyl-diethoxy-silane, dichloro-dimethoxy-silane, tributyl-phosphate, triphenyl-phosphite.

The reaction conditions, and the ratios between the reactants (1), (2), (3) and (4) are selected in such a way, that in the catalytic component the Mg/Ti(V), halogen/Ti(V), halogen/Mg and OR/Ti(V) ratios are comprised within the above-specified ranges. (See Summary of the Invention).

If the components (1) and (2) are reacted with a compound (3) capable of only carrying out a halogenating action, it is necessary that also a reducing compound (3) is used, which is capable of at least partially reducing to the trivalent state the transition metal present in component (2).

Silicon compounds which can be used as reducing agents are:

the silanes Si$_n$H$_{2n+2}$, wherein n is a number equal to, or larger than 1, preferably equal to, or larger than 3, e.g., Si₃H₈;

the alkyl- or aryl-silanes R$_x$SiH$_{4-x}$, wherein R=alkyl or aryl, and x is a number ranging from 1 to 3 (with the limits being included), e.g., (C₆H₅)₃SiH;

the alkoxy- or aryloxy-silanes (RO)$_x$SiH$_{4-x}$, wherein R=alkyl or aryl, and x is a number ranging from 1 to 3 (with the limits being included), e.g., (C₂H₅O)₃SiH;

the polyalkyl-hydroxy-siloxanes, having the formula:

wherein R is an alkyl radical of from 1 to 10 C atoms, or an aryl, alkoxy or aryloxy, and n is a number lower than 10,000, generally within the range of from 3 to 100.

In order to prepare the catalytic components of the invention, the components (1), (2), (3) and (4) may be reacted either (a) in an aliphatic or aromatic hydrocarbon diluent, when at least one of the reactants is soluble in such a diluent, or (b) in the absence of a diluent, when at least one of the reactants is in the liquid state at reaction pressure and temperature.

Preferably, after reacting the components (1) and (2) until a homogeneous product is obtained, this homogeneous product is reacted with the components (3) and (4). According to an alternative method, which gives very good results, the product from the reaction between (1), (2) and (3) is subsequently treated with (4), optionally in the presence of an aromatic, aliphatic or cycloaliphatic hydrocarbon solvent.

The above reactions are carried out at a temperature of from −10° C. to +250° C., preferably of from 20° C. to 200° C., with the temperature being selected also as a function of the type of components (3) and (4) employed.

The components (1) and (2) are used in such amounts, as to have an Mg/transition metal atomic ratio of from 0.2 to 50, preferably of from 0.5 to 5 component (3) is used in the an amount of at least 2, and preferably 4–10 gram-atoms of halogen per gram-atom of transition metal. From 0.1 to 100, preferably 0.5 to 20, gram-equivalents of reducer compound per gram-atom of the transition metal are employed.

The electron-donor compound (4) is used in such a way as to have an electron donor/Mg molar ratio of from 0.01 to 10, and preferably from 0.1 to 1.

The Second Method

Reaction between:

(I) a Ti or V compound as defined for component (2) in the First Method, such as, e.g. Ti(O-n-C₃H₇)₄; Ti(O-n-C₄H₉)₄; Ti(OC₆H₅)₄; polyoxyalkyleneglycol orthotitanates, V(O-n-C₃H₇)₄; VO(O-n-C₃H₇)₃; V(acetylacetonate)₃;

(II) a complex having the general formula:

wherein:

M = Ba, Ca, Mg or Mn;
X = chlorine or bromine;
R = a hydrocarbon radical of from 1 to 20 C atoms, in particular an alkyl of from 1 to 10 C atoms, a cycloalkyl of from 6 to 8 carbon atoms, or an aryl;
n = a number ranging from 1 to 4 (with the limits being included);
p = an integer ranging from zero to 1 (with the limits being included);
n+p = a number comprised within the range of from 1 to 4 (with the limits being included).

Representative examples of component (II) are the following:

$MgCl_2 \cdot 2AlC_2H_5Cl_2$;

$MgCl_2 \cdot 2.5Al\text{-}i\text{-}(C_4H_9)Cl_2$;

$MgCl_2 \cdot 1.5Al\text{-}n\text{-}C_4H_9Cl_2$;

$CaCl_2 \cdot 4AlC_2H_5Cl_2$;

$BaCl_2 \cdot AlCl_3 \cdot AlC_2H_5Cl_2$.

(III) an electron-donor compound, as defined for component (4) in the First Method.

The reaction between components (I), (II) and (III) may be carried out in various ways: the process is always performed under conditions such that the ratio of the catalytic components are as above shown for Mg/Ti(V), halogen/Ti(V), halogen/Mg, and OR/Ti(V). The preferred method generally involves in reacting the mixture of the reactants in an Mg/transition metal atomic ratio of from 1 to 10, at a temperature of from 0° C. to 150° C., or even lower than 0° C., but preferably from 20° C. to 140° C.; and there after separating the solid reaction product from the liquid phase. The reaction modalities can be different, e.g.:

a) the reaction can be carried out in a hydrocarbon diluent, such as n-hexane, n-heptane, cyclohexane, toluene; or b) the component (II) can be submitted to an atomization treatment in the presence of components (I) and (III).

In any case, the component (III) is used in such an amount as to have an electron donor/Mg molar ratio of from 0.01 to 10, and preferably of from 0.1 to 1.

A particular advantage of the catalysts of the present invention is that component (II) may be dissolved in an excess of Al-alkyl dihalide, and such solution may be impregnated with an inert support. The inert support may already contain a transition metal compound and the electron-donor compound, or these may be added to the support at a later time.

Particularly suitable supports are $Al_2O_3$ and $SiO_2$ having high values of surface area, and a pore volume larger than 0.3 cc/g, $TiO_2$, $ZrO_2$, or polymers.

By operating according to one of the two hereinabove disclosed methods, or by still other methods, solid catalytic components are obtained which, in combination with aluminum organometallic compounds, preferably Al-trialkyls, yield catalysts capable of supplying elastomeric copolymers of ethylene and/or alpha-olefins of general formula $R\text{---}CH\text{=}CH_2$ ($R=C_1\text{-}C_6$ alkyl), optionally with conjugated and non-conjugated dienes, endowed with low tension set values.

The alpha-olefin preferably used in combination with ethylene is propylene; preferred dienes are, 1,3-butadiene, 10-methyl-1,9-undecadiene, 1,9-decadiene, 5-ethylidene-2-norbornene, but more preferably 1,3-butadiene or 5-ethyldiene-2-norbornene, are used.

Representative examples of the aluminum organometallic compounds to be used as co-catalysts, together with the solid catalytic components of the present invention, are the following:

$Al(C_2H_5)_3$,
$Al(i\text{-}C_4H_9)_3$,
$Al(n\text{-}C_8H_{17})_3$,
$Al(i\text{-}C_4H_9)_2H$,
$Al(i\text{-}C_4H_9)H_2$.

The molar ratio of such compounds to the transition metal compound exceeds 1, and is generally from 1 to 100.

The copolymerization of ethylene and/or alpha-olefins, optionally with dienes, is carried out according to known methods, by operating in the presence of an inert hydrocarbon vehicle capable of dissolving the polymer, or in the absence of said solvent. The polymerization is preferably carried out in the presence of liquid propylene as the polymerization vehicle. In this case, the reaction is carried out at a temperature of from 0° C. to 60° C. In a continuous process, the excess monomer is flashed off from the obtained polymer, and is then recycled; due to the high activity of the catalysts of the present invention, it is not necessary to submit the recovered polymer to purification treatments to remove catalytic residues.

The following Examples are supplied for illustrative purposes, and are not limitative of the invention.

Preparation of the Catalytic Component "A0"

To a three-necked glass flask, of 100 cm³ of capacity, and equipped with stirring means, 4.75 g of anhydrous $MgCl_2$ and 38 g of $AlEtCl_2$ are charged under a dry nitrogen atmosphere. With stirring, the mixture is heated to 120° C. and is maintained three hours at this temperature, until the complete dissolving of $MgCl_2$ is obtained. In another flask of 250 cm³ of capacity, a solution of $Ti(O\text{-}n\text{-}Bu)_4$ (25.5 g) in 50 ml of anhydrous n-hexane, is separately prepared.

This latter solution is continuously stirred, and cooled to a temperature of 0° C. The solution of $MgCl_2$ in $AlEtCl_2$ is maintained fluid by being heated at approximately 70° C. The two solutions are combined during a 4-hour time, and the resulting mixture is then heated 1 hour at 60° C.

The top phase is then removed by a siphon, the catalytic solid thus obtained is then repeatedly washed at room temperature with anhydrous n-hexane until all chlorine ions disappear from the washing solvent. The catalytic solid is finally dried 3 hours under vacuum at 40° C. At the analysis, the solid shows the following contents, by weight: Ti=15.7%; Mg=4.5%; Al=2.85%; Cl=50.5%; OBu=9.6%.

Preparation of the Catalytic Component "A1"

Inside a glass flask of 100 cm³ of capacity, equipped with stirring means, 4.75 g of anhydrous $MgCl_2$ and 38 g of $AlEtCl_2$ are reacted by heating at 120° C. for 3 hours, and the complete Dissolution of $MgCl_2$ is obtained.

This solution, is maintained at 70° C. and added dropwise, over a 4-hour time, to a stirred flask of 250 cm³, containing 25.5 g of $Ti(O\text{-}n\text{-}Bu)_4$ and 4.05 g of anisole in 50 cm³ of hexane. The mixture is maintained cooled at 0° C.

At the end of the addition, the resulting mixture is heated up to 60° C. and is maintained 1 hour at this temperature. The formed solid is then filtered off and is repeatedly washed with hexane; finally, it is dried under vacuum at 40° C. for 3 hours. At the analysis, the solid shows the following contents, by weight: Ti=18.15%; Mg=6.05%; Al=0.72%; Cl=50.3%; OBu=10.6%; anisole=3.5%.

Preparation of the Catalytic Component "A2"

The process is carried out as disclosed for the preparation of the Catalytic Component "A1", with the only difference that di-isoamyl-ether (5.94 g) is used instead of anisole.

At the analysis, the solid, dried under vacuum at 40° C. for 3 hours, shows the following contents, by weight: Ti=18.3%; Mg=6.1%; Al=0.8%; Cl=47.7%; OBu=13.1%;

Preparation of the Catalytic Component "A3"

The Catalytic Component "A3" is prepared according to the same synthesis modalities as of the Catalytic Component "A1", by using n-butyl ether (4.89 g) instead of anisole.

The catalyst, dried and analysed, shows the following composition, by weight: Ti=19.1%; Mg=5.7%; Al=0.5%; Cl=50.2%; OBu=14.1%; n-butyl ether=6.0%.

Preparation of the Catalytic Component "A4"

The synthesis is carried according to the same operative modalities as for the Catalytic Component "A1", by using ethyl acetate (4.05 g) instead of anisole.

The dry solid shows the following composition, by weight: Ti=17.4%; Mg=5.5%; Al=0.6%; Cl=48.6%; OBu=11.8%;

Preparation of the Catalytic Component "A5"

The preparation is carried out according to the same synthesis method as of the Catlytic Component "A1", but with anisole being replaced by methyl-p-toluate (MPT) (5.62 g).

The analysis of the dry product shows the following values (by weight): Ti=12.7%; Mg=3.8%; Al=2.5%; Cl=38.35%; OBu=17%; MPT=19.5%.

Preparation of the Catalytic Component "A6"

By the same operating modalities as used for Component "A1", the Catalytic Component "A6" is prepared, by using tributyl-phosphate (9.9 g) instead of anisole.

The obtained catalytic, dried and analysed, shows the following composition, by weight: Ti=16.8%; Mg=4.4%; Al=0.95%; Cl=41.5%; OBu=18.3%.

Preparation of the Catalytic Component "A7"

10 g of the Catalytic Component A0 is charged to a glass flask of 250 cm$^3$ of capacity, and equipped with a mechanical stirrer.

At room temperature, 50 cm$^3$ of anhydrous-toluene and 14.7 g of anisole are added.

The resulting suspension, heated at 80° C., is kept stirred 2 hours.

After decanting the solid, the liquid phase is removed at room temperature. The residue is washed 4 times, each time with 50 cm$^3$ of anhydrous hexane at room temperature, and is finally dried under vacuum at 40° C. for 3 hours.

Its composition by weight is as follows: Ti=17.6%; Mg=5.7%; Al=0.56%; Cl=51.5%; OBu=9.2%; anisole=7.6%

Preparation of the Catalytic Component "A8"

13.9 g of the Catalytic Component prepared by the method "A0" is suspended in 50 cm$^3$ of anhydrous toluene. To the suspension 4.52 g of methyl-p-toluate (MPT) is added, the whole mixture is maintained at 80° C. for 2 hours, and is finally washed and dried according to the modalities as already disclosed for the preparation of the Catalytic Component "A7".

The resulting dry solid residue showed the following composition: Ti=13.5%; Mg=4.2%; Al=2.0%; Cl=42.9%; OBu=4.6%; MPT=23.8%.

Preparation of the Catalytic Component "A9"

To 17.1 g of the Catalytic Component "A0", suspended in 50 cm$^3$ of anhydrous toluene, 2.15 g of dimethoxy-diphenyl-silane (DPMS) was added.

The suspension was slowly heated up to 80° C., and was kept stirred at this temperature for 2 hours.

After washing with hexane, and drying according to the same modality as disclosed for the preparation of the Component "A7", the solid showed the following composition, by weight: Ti=17.2%; Mg=5.2%; Al=1.9%; Cl=53.3%; OBu=6.8%; DPMS=1.7%.

Preparation of the Catalytic Component "A10"

To a flask of 250 cm$^3$ of capacity, 3.6 g of MgCl$_2$ and 27 g of Ti(O-n-Bu)$_4$ are charged.

The mixture is heated, with stirring, at 140° C. for 5 hours, and the resulting solution is diluted, after cooling, with 53 cm$^3$ of n-heptane.

At 48° C. and with stirring, 15 g of polymethylhydrosiloxane is then added during a 2-hour time, and then 22.5 g of SiCl$_4$ is added during the following two hours.

The temperature is increased to 60° C., and the reaction mixture is stirred for further 2 hours. The whole mixture is transferred on a filtering septum and is repeatedly washed at room temperature with n-hexane, until chlorine ions disappear from the washing solvent.

At the analysis, the solid, dried under vacuum at 40° C. for 3 hours, shows the following contents, by weight: Ti=14.4%; Cl=38.3%; Mg=5.8%; OBu=28.5%

Preparation of the Catalytic Component "A11"

13 g of the Catalytic Component "A10" is suspended in 50 cm$^3$ of anhydrous toluene, to it 8.1 g of anisole is added, the whole mixture is kept stirred at 80° C. for 2 hours, and is finally washed and dried according to the same operating modalities as followed for preparing the Catalytic Component "A7".

The resulting product shows the following composition: Ti=13.9%; Mg=5.9%; Cl=38.7% OBu=22.0%; anisole=13.0%.

Preparation of the Catalytic Component "A12"

14 g of Catalyst "A10", suspended in 50 cm$^3$ of toluene, is treated at 80° C., for 2 hours, with 3.65 g of methyl-p-toluate (MPT), according the same modalities as already disclosed for the production of the Component "A7".

The composition of the obtained dry product is the following (by weight): Ti=9.8%; Mg=5.2%; Cl=31.4% OBu=14.8%; MPT=22.6%.

DESCRIPTION OF THE POLYMERIZATION PROCESS

The polymerizations were carried out inside stainless-steel autoclaves, equipped with stirring means, and a temperature-control system.

The volumes of the autoclaves is specified at Tables I and II, together with the operating conditions, and the amounts of reactants used in the individual polymerization tests.

To the autoclaves, after a suitable purging, the desired amount of propylene, and, optionally, of diene, was charged.

After heating to the desired temperature, ethylene was added, until the desired pressure was reached.

The required amount of the Catalytic Component "A", suspended in 20 cm³ of anhydrous heptane, also containing aluminum-tributyl (MAB), was charged.

During the polymerization, the pressure was maintained constant by continuously feeding ethylene to the autoclave.

At the end, the catalyst was quenched by injecting 20 cm³ of acetone containing an amount of Irganox 1010 equivalent to 0.2% by weight, relative to the amount of polymer produced.

After a 5-minute stirring, the monomers were slowly vented, until ambient pressure and temperature are reached.

The recovered polymer was finally dried at 70° C. under a nitrogen stream, and weighed.

The saturated copolymers were cured at 165° C. for 40 minutes, on a platen-press, by using the following formulation (previously extruder-homogenised at 80° C. for 10 minutes):

| | |
|---|---|
| COPOLYMER | 100 parts by weight |
| FEF CARBON BLACK | 80 parts by weight |
| CORTIS 100M OIL | 30 parts by weight |
| ZnO | 5 parts by weight |
| SULPHUR | 0.4 parts by weight |
| PEROXIMON F40 | 5 parts by weight |

The unsaturated terpolymers were cured on a platen-press at 160° C. for 30 minutes, using the following formulation:

| | |
|---|---|
| TERPOLYMER | 100 parts by weight |
| ZnO | 5 parts by weight |
| STEARIC ACID | 1 part by weight |
| FEF CARBON BLACK | 55 parts by weight |
| CORTIS 100M OIL | 30 parts by weight |
| TETRAMETHYLTHIURAM DISULPHIDE | 1.5 parts by weight |
| MERCAPTOBENZOTHIAZOLE | 0.75 parts by weight |
| SULPHUR | 1.5 parts by weight |

EVALUATION OF COPOLYMER PROCESSABILITY

The extrusion performance (extrudability) was evaluated for two compounds containing copolymers obtained using Catalytic Components "A0" and "A1" respectively. The compositions of these two compounds, and the extrusion performance results obtained are reported at Table III. To prepare said compounds, a BANBURY mixer was used.

The extrusion was carried out on a TROESTER type extruder, having a screw of 90 mm, with a central body temperature of 40° C., and a head temperature of 80° C.; the nozzle had an average diameter of 16 mm. The processability of the compounds was expressed as the revolution speed (revolutions per minute) of the screw, necessary to obtain 14 meters/minute of extruded polymer.

The data obtained (Examples 16 and 17, Table III) shows that the compound containing the copolymer obtained with the Catalytic Component "A1" is endowed with better processability characteristics than the compound containing the copolymer obtained with the Catalyst Component "A0", because it requires a lower extruder revolution speed, i.e., shorter extrusion times, with the other operating conditions and the amount of extruded polymer being the same.

TABLE I

| | Example (No.) | | | | | | | | | | | | |
|---|---|---|---|---|---|---|---|---|---|---|---|---|---|
| | 0 | 1 | 2 | 3 | 4 | 5 | 6 | 7 | 8 | 9 | 10 | 11 | 12 |
| Catalytic Component | A0 | A1 | A2 | A3 | A4 | A5 | A6 | A7 | A8 | A9 | A10 | A11 | A12 |
| Total Reactor Capacity (l) | 7.2 | 7.2 | 2.5 | 7.2 | 7.2 | 7.2 | 7.2 | 2.5 | 1.5 | 1.5 | 1.5 | 1.5 | 1.5 |
| Propylene Feedstock (g) | 2400 | 2400 | 720 | 2400 | 2400 | 2400 | 2400 | 720 | 455 | 455 | 455 | 455 | 455 |
| Charged Catalyst Component (g) | 0.011 | 0.03 | 0.0042 | 0.006 | 0.03 | 0.017 | 0.009 | 0.0045 | 0.011 | 0.0037 | 0.018 | 0.0215 | 0.016 |
| (1) Charged MAB (g) | 0.8 | 3 | 1 | 3 | 3 | 3 | 5 | 1 | 1 | 1 | 1 | 1 | 1 |
| Polymerization Temperature (°C.) | 40 | 40 | 40 | 40 | 40 | 40 | 40 | 40 | 40 | 40 | 40 | 40 | 40 |
| Ethylene Partial Pressure (kg/cm²) | 3.8 | 3.1 | 2.5 | 3.1 | 3.1 | 2.5 | 2.1 | 2.5 | 2.8 | 2.8 | 2.8 | 2.8 | 2.8 |
| Total Pressure (kg/cm²) | 19.5 | 18.8 | 18.3 | 18.8 | 18.8 | 18.3 | 17.8 | 18.3 | 18.5 | 18.5 | 18.5 | 18.5 | 18.5 |
| Polymerization Time (h) | 1 | 1 | 1 | 1 | 1 | 1 | 1 | 1 | 1 | 1 | 1 | 1 | 1 |
| Produced Polymer (g) | 970 | 710 | 65 | 170 | 630 | 400 | 140 | 150 | 110 | 85 | 110 | 120 | 145 |
| Yield (Polymer g/Catalyst g) · $10^{-3}$ | 88.2 | 23.7 | 15.5 | 28.3 | 21 | 23.5 | 15.6 | 33.4 | 10.0 | 23.0 | 6.15 | 5.6 | 9 |
| Bonded Propylene (% by weight) | 39 | 42.8 | 42.1 | 41.6 | 38.2 | 39.1 | 48.6 | 42.7 | 47.1 | 42.7 | 47.4 | 55 | 54 |
| $[\eta]^{Tetraline}_{135° C.}$ (dl/g) | 4.24 | 3.48 | 4.05 | 3.16 | 2.7 | 2.65 | 2.85 | 3.54 | 2.98 | 3.31 | 3.37 | 2.43 | 2.6 |
| $ML^{1+4}_{121° C.}$ | 52 | 45 | 69 | 45 | 42 | 32 | 36 | 51 | 29 | 37 | 41 | 38 | 22 |
| Tensile Strength | 177 | 161 | 176 | 163 | 161 | 219 | 194 | 167 | 216 | 174 | 203 | 197 | 189 |

TABLE I-continued

| | | Example (No.) | | | | | | | | | | | |
|---|---|---|---|---|---|---|---|---|---|---|---|---|---|
| | | 0 | 1 | 2 | 3 | 4 | 5 | 6 | 7 | 8 | 9 | 10 | 11 | 12 |
| (2) | (kg/cm$^2$) Elongation at break (%) | 510 | 520 | 505 | 465 | 560 | 315 | 300 | 500 | 340 | 300 | 320 | 330 | 350 |
| | (3) Tension Set 200% 23° C. | 14 | 8 | 8 | 10 | 10 | 6 | 7 | 8 | 6 | 10 | 6 | 8 | 6 |

(1) 1:1 Molar Al(iC$_4$H$_9$)$_3$/Al(nC$_4$H$_9$)$_3$ blend in hexane solution (150 g/l)
(2) Tested on cured polymer
(3) ASTM D. 412/68

TABLE II

| | Example (No.) | | |
|---|---|---|---|
| | 13 | 14 | 15 |
| Catalytic Component | A0 | A1 | A1 |
| Total Reactor Capacity (l) | 1.5 | 1.5 | 1.5 |
| Propylene Feedstock (g) | 455 | 455 | 455 |
| Diene Feedstock-Type | 1,3-butadiene | 1,3-butadiene | ethylidene-norbornene (ENB) |
| Amount (g) | 36 | 36 | 19.5 |
| Charged Catalyst Component (g) | 0.013 | 0.026 | 0.043 |
| (1) Charged MAB (g) | 1 | 1 | 1 |
| Polymerization Temperature (°C.) | 40 | 40 | 40 |
| Ethylene Partial Pressure (kg/cm$^2$) | 3 | 2.1 | 2.5 |
| Total Pressure (kg/cm$^2$) | 17.6 | 16.7 | 17.8 |
| Polymerization Time (h) | 2 | 2 | 2 |
| Produced Polymer (g) | 80 | 70 | 75 |
| Yield (Polymer g/Catalyst g) · 10$^{-3}$ | 6.2 | 2.8 | 1.75 |
| Bonded propylene (% by weight) | 35.2 | 38.8 | 50.1 |
| Bonded Butadiene (% by weight): | | | |
| in 1,2-position | 0.25 | 0.25 | — |
| in 1,4-position | 1.1 | 1.8 | — |
| Bonded E.N.B. (%) | — | — | 7.1 |
| [η] Tetraline 135° C. dl/g | 3.79 | 3.85 | 2.8 |
| (2) Tensile Strength (kg/cm$^2$) | 96 | 90 | 93 |
| Elongation at break (%) | 815 | 720 | 270 |
| (3) Tension Set 200% 23° C. | 34 | 20 | 20 |

(1) 1:1 Molar Al(iC$_4$H$_9$)$_3$/Al(nC$_4$H$_9$)$_3$ blend in hexane solution (150 g/l)
(2) Tested on cured polymer
(3) ASTM D.412/68.PA

TABLE III

| COMPOUND FORMULATION (parts by weight) | Example 16 | Example 17 |
|---|---|---|
| Copolymer produced with Component A0 (C3 = 43%; [η] = 2.5 dl/g | 85 | — |
| Copolymer produced with Component A1 (C3 = 46%; [η] = 2.6 dl/g | — | 85 |
| Irganox 1076 | 0.2 | 0.2 |
| ZnO | 5 | 5 |
| Stearic Acid | 1 | 1 |
| Carbowax 4000 | 2.5 | 2.5 |
| SRF | 58 | 58 |
| HAF | 43 | 43 |
| Plastikator 32 | 3 | 3 |
| Sinfluid AR 25 | 30 | 30 |
| Sulphur | 0.25 | 0.25 |
| Caloxol W3 | 6 | 6 |
| Peroximon F40 | 3.6 | 3.6 |
| Trigonox 29/40 | 1.8 | 1.8 |
| Mooney ML (1 + 4) 100° C. | 52 | 51 |
| Screw Revolution Speed to Produce | 40 | 29 |
| 14 metres of polymer/minute | | |

What we claim is:

1. Components of catalysts for preparation of elastomeric copolymers of ethylene with alpha-olefins, or of ethylene with alpha-olefins and at least one diene, comprising:
   (a) a magnesium compound selected from the group consisting of anhydrous magnesium halides and compounds having general formula XMgOR, or XMgR, wherein X is a halogen and R is a $C_1$-$C_{20}$ alkyl, cycloalkyl or aryl radical;
   (b) a halo-alcoholate of a vanadium metal, wherein said vanadium metal is at least partially trivalent, the halogen atom and alkoxy group of said halo-alcoholate being bound to said metal, said alkoxy group being selected from the group consisting of (i) radicals having formula —OR' wherein R' is alkyl, aryl or cycloalkyl containing from 1 to 20 carbon atoms, and (ii) an acetyl-acetone radical containing from 1 to 20 carbon atoms, wherein the atomic ratios are as follows:
   $0.2 \leq Mg/V \leq 50$;
   halogen/V > 2;
   halogen/Mg > 2; and
   OR'/V $\leq$ 1.5; and
   (c) an electron donor compound selected from the group consisting of organic ethers, organic carboxylic acid esters, silicon or phosphorous-containing inorganic acid esters, silanes and siloxanes.

2. The catalyst components of claim 1, wherein said halo-alcoholate has the formula: $M^n(OR')_a X_b$, wherein:
   M = V;
   n = valence of M;
   a and b are integers, the sum of which is equal to n;
   R' = alkyl, aryl or cycloalkyl group containing from 1 to 20 carbon atoms; and
   X = halogen.

3. The catalyst components of claim 1, wherein said halo-alcoholate has the formula: $M^n(R'')_a X_b$, wherein:
   M = V;
   n = valence of M;
   a and b are integers, the sum of which is equal to n;
   R'' = an acetyl-acetone radical; and
   X = halogen.

4. Catalytic components according to claim 1, wherein the Mg/V atomic ratio is equal to at least 0.5, the halogen/V atomic ratio is from 4 to 10, the halogen/Mg atomic ratio is from 4 to 8, and the OR'/V atomic ratio is equal to or lower than 1.

5. Catalytic components according to claim 1, wherein the molar ratio of component C to Mg is from 0.01 to 10.

6. Catalytic components according to claim 1, wherein the magnesium compound is magnesium chloride.

7. Catalysts for preparing elastomeric copolymers of ethylene with alpha-olefins, comprising (a) an Al-alkyl compound; and (b) a catalyst component as defined in claim 1.

8. Components of catalysts for preparation of elastomeric copolymers of ethylene with alpha-olefins, or of ethylene with alpha-olefins and at least one diene, comprising:
   (a) a magnesium compound selected from the group consisting of anhydrous magnesium halides and compounds having general formula XMgOR or XMgR, wherein X is a halogen and R is a $C_1-C_{20}$ alkyl, cycloalkyl or aryl radical;
   (b) a halo-alcoholate of a titanium metal, wherein said titanium metal is at least partially trivalent, the halogen atom and alkoxy group of said halo-alcoholate being bound to said metal, said alkoxy group being selected from the group consisting of (i) radicals having formula —OR' wherein R' is alkyl, aryl or cycloalkyl containing from 1 to 20 carbon atoms, and (ii) an acetyl-acetone radical containing from 1 to 20 carbon atoms, wherein the atomic ratios are as follows:
   $0.2 \leq Mg/Ti \leq 50$;
   halogen/Ti > 2;
   halogen/Mg > 2; and
   $OR'/Ti \leq 1.5$; and
   (c) an electron donor compound selected from the group consisting of organic ethers, organic carboxylic acid esters, silicon or phosphorous-containing inorganic acid esters, silanes and siloxanes.

9. The catalyst components of claim 8, wherein said halo-alcoholate has the formula: $M^n(OR')_aX_b$, wherein:
   M = Ti;
   n = valence of M;
   a and b are integers, the sum of which is equal to n;
   R' = alkyl, aryl or cycloalkyl group containing from 1 to 20 carbon atoms; and
   X = halogen.

10. The catalyst components of claim 8, wherein said halo-alcoholate has the formula: $M^n(R'')_aX_b$, wherein:
    M = Ti;
    n = valence of M;
    a and b are integers, the sum of which is equal to n;
    R'' = an acetyl-acetone radical; and
    X = halogen.

11. Catalytic components according to claim 8, wherein the Mg/Ti atomic ratio is equal to at least 0.5, the halogen/Ti atomic ratio is from 4 to 10, the halogen/Mg atomic ratio is from 4 to 8, and the OR'/Ti atomic ratio is equal to or lower than 1.

12. Catalytic components according to claim 8, wherein the molar ratio of component C to Mg is from 0.01 to 10.

13. Catalytic components according to claim 8, wherein the magnesium compound is magnesium chloride.

14. Catalysts for preparing elastomeric copolymers of ethylene with alpha-olefins, comprising (a) an Al-alkyl compound; and (b) a catalyst component as defined in claim 8.

* * * * *